US005799298A

United States Patent [19]
Bingham et al.

[11] Patent Number: 5,799,298
[45] Date of Patent: Aug. 25, 1998

[54] METHOD OF INDIRECT SPECIFICATION OF USER PREFERENCES

[75] Inventors: Ronald Edward Bingham, Capitola; Michael Jon Dockter, Hollister; Joel Frank Farber, San Jose; Michael Leon Pauser, Morgan Hill; Randal James Richardt, San Jose, all of Calif.

[73] Assignee: International Business Machines Corporation, Armonk, N.Y.

[21] Appl. No.: 863,534

[22] Filed: May 27, 1997

Related U.S. Application Data

[63] Continuation of Ser. No. 512,272, Aug. 7, 1995, abandoned.
[51] Int. Cl.[6] ........................................ G06F 17/30
[52] U.S. Cl. .................... 707/1; 707/501; 707/513; 707/516; 707/345; 707/5; 707/6
[58] Field of Search .......................... 395/601; 707/1, 707/501, 513, 516, 345, 5, 6

[56] References Cited

U.S. PATENT DOCUMENTS

| 4,870,568 | 9/1989 | Kahle et al. | 364/200 |
|---|---|---|---|
| 5,132,900 | 7/1992 | Gilchrist et al. | 364/419 |
| 5,261,044 | 11/1993 | Dev et al. | 395/159 |
| 5,408,655 | 4/1995 | Oren et al. | 395/600 |
| 5,535,321 | 7/1996 | Massaro et al. | 395/155 |
| 5,555,365 | 9/1996 | Selby et al. | 395/159 |
| 5,559,948 | 9/1996 | Bloomfield et al. | 395/159 |

*Primary Examiner*—Thomas G. Black
*Assistant Examiner*—Jean M. Corrielus
*Attorney, Agent, or Firm*—Randy W. Lacasse; David J. Kappos; Marilyn Smith Dawkins

[57] ABSTRACT

A system and method for allowing communication of a large number of parameters from a computer user to an application program with a relatively small amount of interaction. The system uses a plurality of graphical metaphors to represent a collection of known personality or collective knowledge representations to extract a computer user's preferences. A computer user expresses how much likeness exists between themselves and a set of metaphoric graphical objects which is translated into an intermediary format which enables the computer to provide a higher quality of pattern matching and differentiation.

7 Claims, 8 Drawing Sheets

Willie Wizard

User ID: [          ]

Password: [          ]

[          ]

All dialogs that follow are work in progress and are subject to change (or break) without notification. Any problems? Contact Michael L. Pauser at (408) 463-4354 [michaelpauser@vnet.ibm.com].

User Setup ] [  Glossary ]

FIG. 3 aqui Persona

Your Home ] [  Index ] [

The following dialog will allow you to select a pre-built persona or combine multiple personas to create your own unique persona. Click on the icon to find out more about an individual persona. Enter a number from 0 to 100 select how much you are like each person (0 Not at all, 100 That's me exactly). Optionally, you can enter a userid and password to access the KnU/*aqui* system (default is anonymous). When finished, press the Apply button to continue.

If you want to *clone* another KnU/*aqui* user's persona, click here.

Freddy Funlover

Granny Joe

Lisa Learner

Marty Mover

Ricki Rebel

Sam Seeker

Sara Scout

Willie Wizard

User ID: ☐
Password: ☐

FIG. 4a

[🏠] Your Home ] [ [📇] Index ] [ [?] Help ]

The following dialog will allow you to make a connection between two different URLs. Please enter a source URL, a target URL, and a description of why you made this connection. You may also set the persona preference for this connection. Optionally, you can enter a userid and password to access the KnU/*aqui* system (default is anonymous). Finally, press Connect! to make the connection.

Make a connection from the source URL:
[                                                                          ]

To the target URL:
[                                                                          ]

Description: [                                        ]

Who Would Be Interested In This Connection?

Freddy Funlover

Granny Joe

Lisa Learner

Marty Mover

Ricki Rebel

Sam Seeker

Sara Scout

User ID:
Password:

All dialogs that follow are work in progress and are subject to change (or break) without notification. Any problems? Contact Michael L Pauser at (408) 463-4354 [michaelpauser@vnet.ibm.com].

User Setup ] [  Glossary ]

Willie

| Pref. | Conf | Percent | Attribute Value |
|---|---|---|---|
| | | | The Jungian Archetype |
| 0.99 | 100 | | is innocent |
| 0.99 | 100 | | is orphan |
| 0 | 0 | | is warrior |
| 0 | 0 | | is caretaker |
| 0 | 0 | | is seeker |
| 0.25 | 20 | | is destroyer |
| 0 | 0 | | is lover |
| 0.25 | 20 | | is creator |
| 0 | 0 | | is ruler |
| 0.15 | 10 | | is magician |
| 0.2 | 20 | | is sage |
| 0.2 | 20 | | is fool |
| | | | The goal |
| 0.99 | 100 | 100% | is safety |
| 0.50 | 100 | 50% | is to regain safety |
| 0.00 | 0 | 100% | is to win |
| 0.00 | 0 | 100% | is to help others |
| 0.00 | 0 | 100% | is to search for better way |
| 0.38 | 60 | 150% | is growth |
| 0.00 | 0 | 100% | is unity |
| 0.25 | 20 | 100% | is creation of work reality and life |
| 0.00 | 0 | 100% | is a harmonious community |
| 0.26 | 40 | 175% | is transformation from lesser to greater |
| 0.06 | 15 | 40% | is truth |
| 0.20 | 25 | 100% | is enjoyment and pleasure |
| | | | Fear |
| 0.99 | 100 | 100% | of abandonment |
| 0.99 | 100 | 100% | of exploitation |
| 0.00 | 0 | 100% | of weakness |
| 0.00 | 0 | 100% | of selfishness |
| 0.00 | 0 | 100% | of conformity and entrapment |
| 0.13 | 10 | 50% | of stagnation and annihilation |

FIG. 6a

Willie

| | | | | | | | |
|---|---|---|---|---|---|---|---|
| 0.00 | 0 | 100% | of loss of love | | | | |
| 0.10 | 10 | 40% | of failure of imagination | | | | |
| 0.00 | 0 | 100% | of chaos and loss of control | | | | |
| 0.06 | 10 | 40% | of negative transformation | | | | |
| 0.08 | 10 | 40% | of deception and illusion | | | | |
| 0.08 | 10 | 40% | of nonaliveness | | | | |
| | | | The Problem | | | | |
| 0.99 | 100 | 100% | is to deny or seek rescue | | | | |
| 0.99 | 100 | 100% | is cynical compliance and wish for rescue | | | | |
| 0.00 | 0 | 100% | is to kill defeat or convert it | | | | |
| 0.00 | 0 | 100% | is to take care of it or those it harms | | | | |
| 0.00 | 0 | 100% | is to leave it, escape, or take off | | | | |
| 0.20 | 20 | 80% | is to be destroyed or destroy | | | | |
| 0.00 | 0 | 100% | is to love it | | | | |
| 0.35 | 30 | 140% | is to accept it or create another reality | | | | |
| 0.00 | 0 | 100% | is to find its constructive use | | | | |
| 0.06 | 10 | 40% | is to transform or heal it | | | | |
| 0.08 | 10 | 40% | is to study understand or transcend it | | | | |
| 0.20 | 30 | 100% | is to play with it or play tricks on it | | | | |
| | | | The Task | | | | |
| 0.59 | 50 | 60% | is fidelity discernment | | | | |
| 0.99 | 100 | 100% | is process disillusionment and receive help from others | | | | |
| 0.00 | 0 | 100% | is fighting for what really matters | | | | |
| 0.00 | 0 | 100% | is giving without hurting self or others | | | | |
| 0.00 | 0 | 100% | is to become true to a higher truth | | | | |
| 0.08 | 10 | 30% | is to learn to let go accept mortality | | | | |
| 0.00 | 0 | 100% | is to follow your bliss, commit to what you love | | | | |
| 0.25 | 30 | 100% | is self creation and self acceptance | | | | |
| 0.00 | 0 | 100% | is to take full resp. and express deeper Self in world | | | | |
| 0.09 | 10 | 60% | is alignment of Self with cosmos | | | | |
| 0.14 | 10 | 70% | is to acquire knowledge and find wisdom | | | | |
| 0.20 | 15 | 100% | is to trust process and enjoy journey for its own sake | | | | |
| | | | Gift | | | | |
| 0.40 | 50 | 40% | is trust optimism loyalty | | | | |
| 0.40 | 50 | 40% | is realism empathy interdependence | | | | |
| 0.00 | 0 | 100% | is courage discipline & skill | | | | |
| 0.00 | 0 | 100% | is compassion, generosity | | | | |
| 0.00 | 20 | 100% | is autonomy, ambition | | | | |
| 0.10 | 0 | 40% | is humility acceptance | | | | |
| 0.00 | 0 | 100% | is commitment passion ecstasy | | | | |
| 0.25 | 20 | 100% | is creativity identity vocation | | | | |
| 0.00 | 0 | 100% | is responsibility competence sovereignty | | | | |
| 0.15 | 20 | 100% | is personal power | | | | |
| 0.14 | 15 | 70% | is wisdom skepticism nonattachment | | | | |
| 0.20 | 20 | 100% | is joy freedom liberation | | | | |

FIG. 6b

METHOD OF INDIRECT SPECIFICATION OF USER PREFERENCES

This application is a continuation of application Ser. No. 08/512,272, filed Aug. 7, 1995, now abandoned.

BACKGROUND OF THE INVENTION

1. Field of Invention

The present invention is generally directed to user interfaces which obtain information about a computer user. More specifically, the invention relates to a method of interactively obtaining user preferences based on selection of graphical objects.

2. Related Materials and Definitions

This application is related to the following co-pending applications which are hereby incorporated by reference:

FACILITY FOR THE INTELLIGENT SELECTION OF INFORMATION OBJECTS (PERSONA)-(application Ser. No. 08/262,834) is now allowed METHOD FOR GENERATING CONNECTIONS BETWEEN OBJECTS IN A COMPUTER NETWORK (Grinding) (application Ser. No. 08/262,999) now U.S. Pat. No. 5,608,900, METHOD FOR THE ASSOCIATION OF HETEROGENEOUS INFORMATION (application Ser. No. 08/262,838) is now allowed, FACILITY FOR THE STORAGE AND MANAGEMENT OF CONNECTIONS (CONNECTION SERVER) (application Ser. No. 08/267,022) is now application Ser. No. 08/741,291, now U.S. Pat. No. 5,687,367, Computer applications often require a series of parameters to determine what action to take. It is frequently the responsibility of the computer user to specify many of these parameters in order to complete the proper sequencing and ultimately the completion of any interaction with the application. An application requiring a level of 100–200 parameters would far exceed the normal capability of the average computer user. In addition to the sheer amount of time necessary to comply with parameter requests, a user may make mistakes, not have a proper perspective of what is being requested or loose interest in the process.

What is needed is an intermediate step that is easy for the user to interact with that can produce these parameters in a shorter time and with greater certainty of accuracy. In other areas of computer interaction it is often the case that a prior history or pattern can statistically predict future results. What is needed is a method of manipulating a user's prior history when specifying variables as knowledge to produce levels of parameterization. The specific application of the above method would be applied in an effort to extract a user's personality or typical preferences.

3. Discussion of Prior Art

A product from Microsoft®, Microsoft Bob™, uses avatars which could be dogs, teddy bears , snails, etc. which are intentionally not photographically real (i.e. animated characters) and represent non threatening tour guides for a single level of interaction. The user can select a object that then operates in a tour guide mode, but does not have the ability to blend the characteristics of each symbol to obtain additional levels of information.

The problem with the prior art is there has been no effective method of metaphorically expressing user preferences which can cover the full gambit of personalities, emotions, or preferential choices. In addition, no effective method has been developed to interact with the enormous set of possible parameters in a short time period, accurate in content and able to keep the interest of the user throughout the process.

SUMMARY OF THE INVENTION

Objects of the Invention

It is an object of the present invention to provide a method of interfacing with a computer user to obtain user preferences.

It is also an object of the present invention to provide a method of interactively extracting a computer user's preferences using metaphoric objects.

It is also an object of the present invention to provide a system and method for allowing communication of a large number of parameters using a small number of interactions.

It is also an object of the present invention to provide a method of obtaining a manageable set of preferences to accurately obtain knowledge which can be translated into parameterizations.

It is also an object of the present invention to develop metaphors that a person has knowledge about without significant teaching.

It is also an object of the present invention to develop metaphors which imply a common language without an external specification of the language.

These and other objects of the invention will become evident when taken in conjunction with the drawings, claims and description of the preferred embodiments of the invention.

The present invention provides a system and method for allowing communication of a large number of parameters from a computer user to an application program with a small amount of time or knowledge interaction. The system uses a plurality of graphical metaphors to represent a collection of known personality or collective knowledge representations to extract a computer user's preferences.

A computer user expresses how much likeness exists between themselves and a set of metaphoric graphical objects which is translated into an intermediary format which enables the computer to provide a higher quality of pattern matching and differentiation.

BRIEF DESCRIPTION OF THE DRAWINGS

FIGS. 6a and 6b, in combination provide a spreadsheet representation of a selected personality character and its attributes.

DETAILED DESCRIPTION

Pattern Matching/Differentiation

Figure 1:
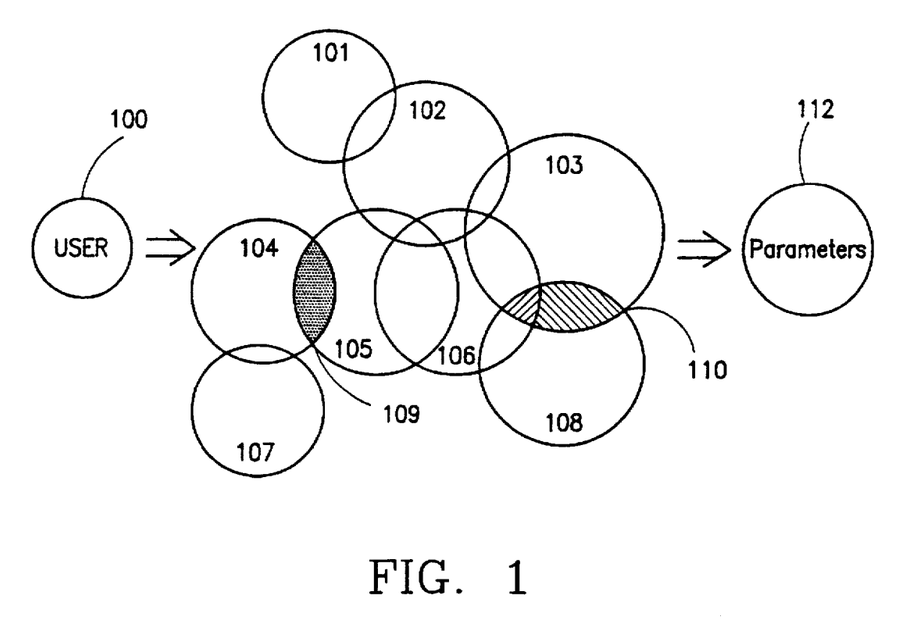
FIG. 1 illustrates a union set theory example.

To illustrate a conceptual development of a set of intermediate metaphors, a basic discussion of set theory may be useful. As shown in FIG. 1, eight circles 101, 102, 103, 104, 105 106, 107 and 108 represent various people having known personality traits. Each of the circles may represent a distinct generalized personality (i.e. scientist, clown, jock, teacher, millionaire, etc.) which would be commonly recognized by an average or specifically targeted group of computer users. Taken individually each of the circles may contain a very large number of traits which make up each personality. It is the intersection of these circles where common traits may exist and the non-intersection of these circles where differentiation exists.

By asking a user to select how much they feel they are like or not like each of the eight personality traits a series of overlaps will be noted. These overlaps, according to union theory, expand the original eight regions of parameters to many regions that overlap and cancel. For example, in FIG. 1, many subregions exist which now represent the union of personalities (109, 110, 111, etc.) for a total of approximately 22 different subsets. The overlap and non-overlap of these intersections shows a reinforcement and differentiation of a particular aspect of each the characters personality.

A computer user looks at the cast of characters of eight and tries to decide who are they most like. They can then rank these personalities to obtain a blend of characters which can produce a a set of parameters which can be processed by the computer application.

By asking the computer user 100 to only evaluate eight characters, a large number of parameters 112 can be evaluated. This example, in a simplified form, illustrates how people through an indirect method can cover a spectrum of possibilities without having knowledge of every possible parameter.

The present invention must imply a common language without external specification of the language. It is important that the metaphoric language tap into a highly well understood method for describing information at a high level (i.e., recognizing personality types that can be recognized globally by other psychologists). The metaphor group could apply to other things—dog lovers, librarians, scientists. People with the same interests could all find the same information, not because they know each other, but because they have similar common experiences/interests.

DESCRIPTION OF THE PREFERRED EMBODIMENTS

The preferred embodiments of the instant invention operate within the framework of the co-pending application PERSONA, which is hereby incorporated by reference, and provides one method of interaction within that context. Many different applications may equally operate within the PERSONA framework and therefore this invention should not be considered to limit applicability nor should the present invention be limited to operate only within the PERSONA framework.

PERSONA lets a person describe themself so that the computer can act as their agent. This invention wants to simplify the process to develop enough information by asking a limited amount of questions.

In the preferred embodiments, a cast of eight metaphoric characters are created which represent a broad spectrum of human experiences. The characters must have a broad spectrum of age, gender, race, intellect, etc., in an attempt to encompass the entire spectrum of possibilities. Each character's personality is made up of a number of preselected attributes which can be selected as desired but must conform to proven personality attribute make-ups to achieve optimum results.

The specific application is to enable a user to provide information about a connection (e.g. a dog icon may be connected to page about a veterinarian clinic). With respect to connections it is important to have relative attribute values of a connection represent: 1) who made the connection, 2) what are we pointing to and 3) what is the relationship (attributes).

A desirable way of associating attributes with connections is essential in enabling a computer user of a particular interest level or personality to be intelligently and quickly directed to particular documents/data of interest. Who would be interested, what is the personality of the person making the connection and who would be interested in seeing the particular connection are all questions that the are answered by the present invention as described hereafter.

Figure 2:
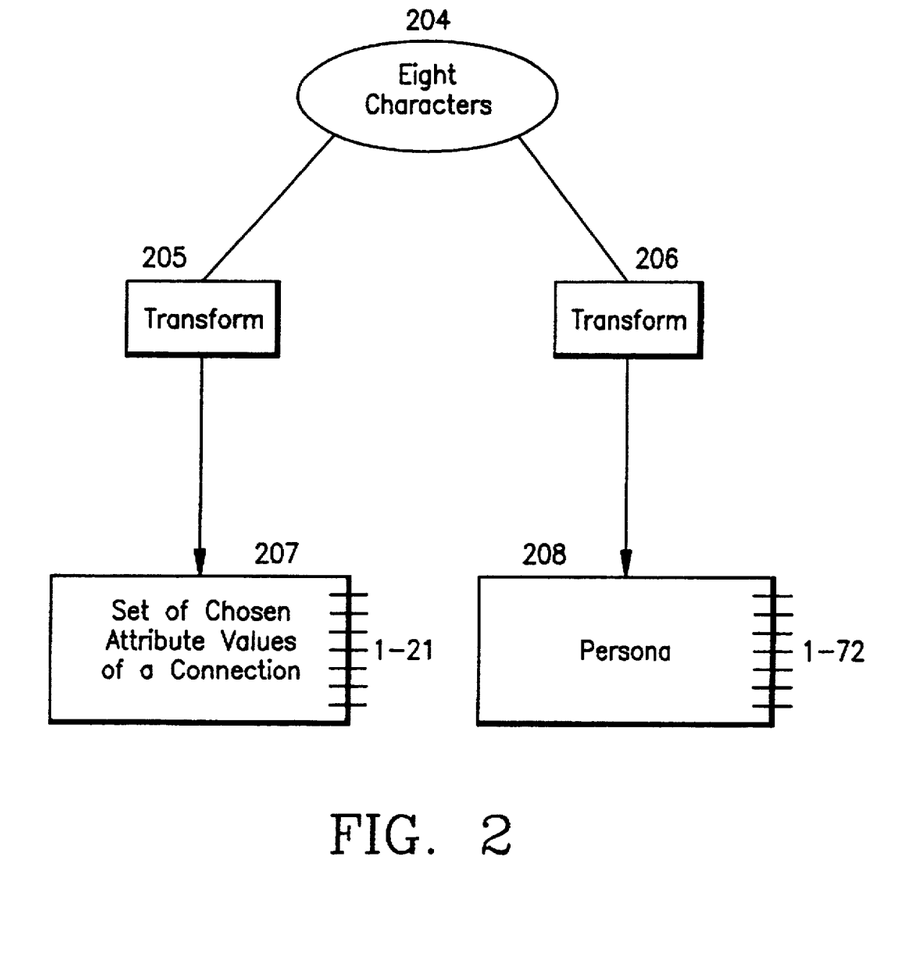
FIG. 2 illustrates the attribute selection and preference building overview.

FIG. 2, illustrates a first transform 206 which obtains a ranked list of possible attributes for Persona 208 and a second transform 205 which takes a character and turns it into a set of discrete attribute values to attach to a connection. The particular transform methods are discussed further hereafter in the discussion of FIG. 5.

In the preferred implementation approximately 21 available attributes were differentiation maximized out of a total of 72 attribute pairs. The numerical values of 72 attribute pairs and subset of 21 attribute pairs were selected using an iterative process using successive approximation to determine optimum values. The object is to maximize differentiation while minimizing the amount of information carried. Using different character sets would produce different maximized number ranges.

Figure 3:
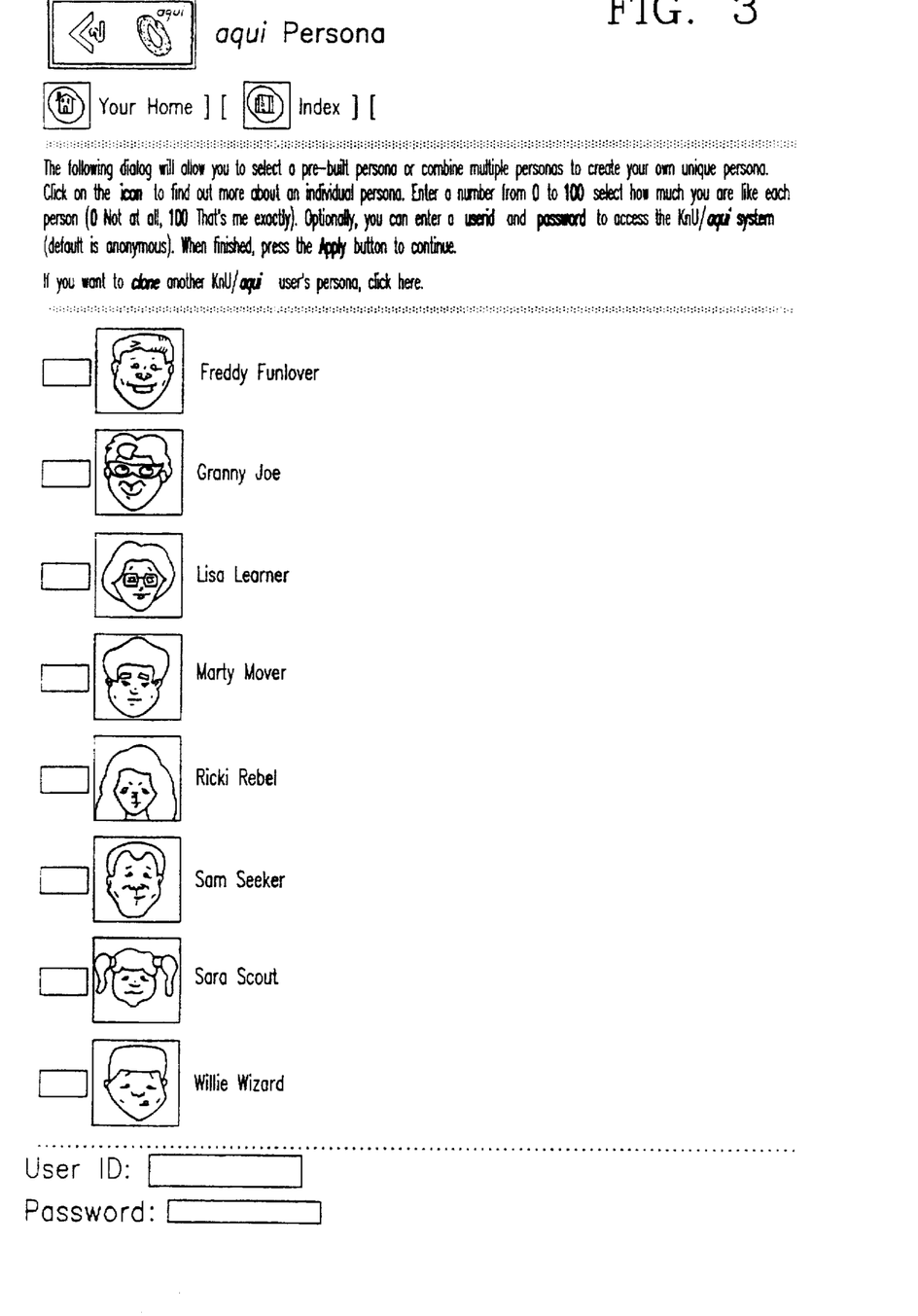
FIG. 3 illustrates the eight character template of the preferred embodiment used to determine the computer users personality/preferences.

FIG. 3 illustrates the preferred implementation using the eight characters Freddy Funlover, Granny Joe, Lisa Lerner, Marty Mover, Ricki Rebel, Sam Seeker, Sara Scout and Willie Wizard. The user is asked to place a value in the box to the left of each character a value of how much like each character their own personality or preferences resemble. It is this process which initiates the persona transformation of element 206.

Appendix A, pages 1 and 2 collectively, provide for profile definitions of each of the above eight characters. Such definitions provide a level of training to familiarize a user with the characteristics of each of the above eight characters.

Figure 4A:
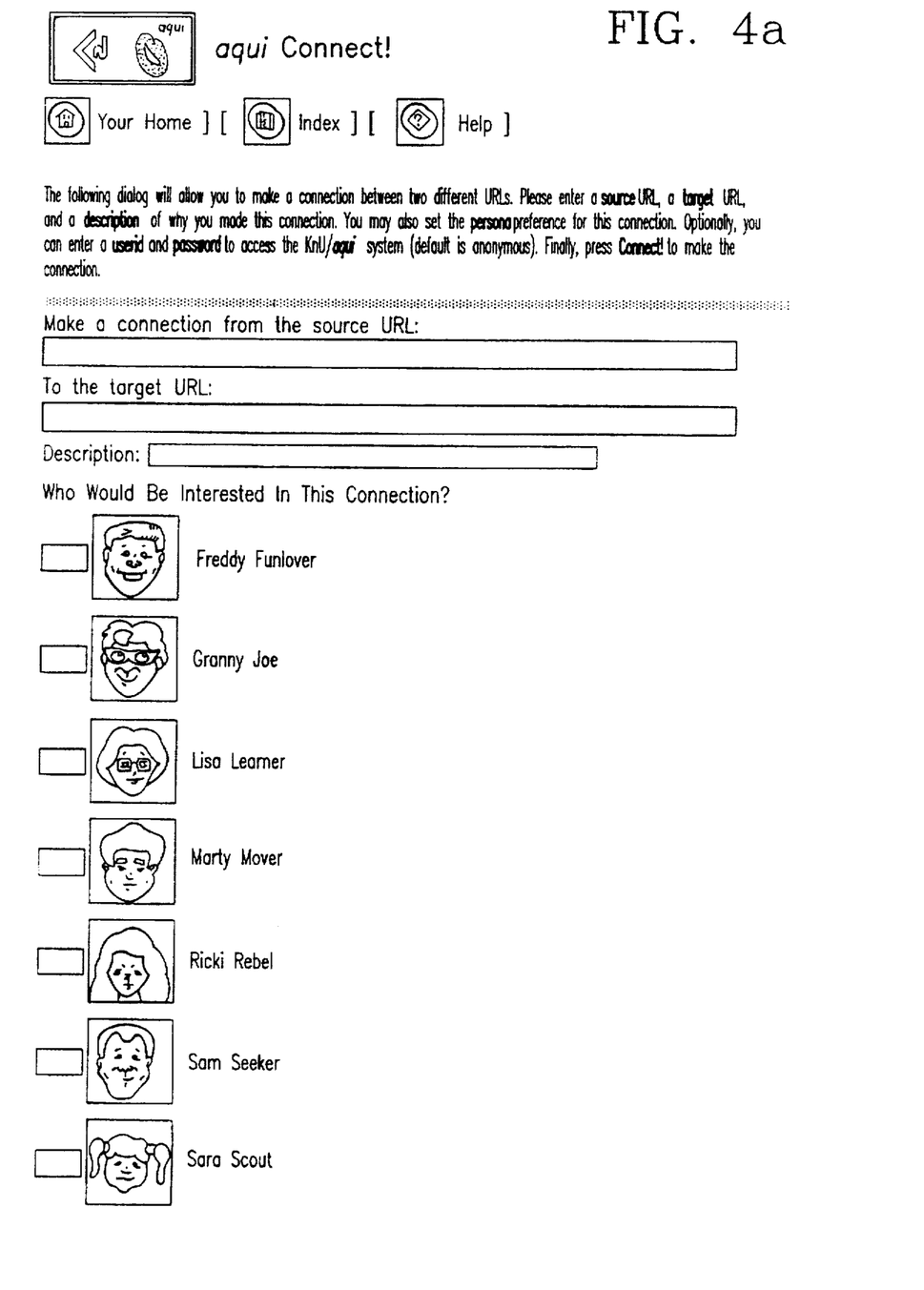
FIGS. 4a and 4b, collectively illustrate the eight character template used to determine who may be interested in a particular connection that a computer user is making.
Figure 4B:
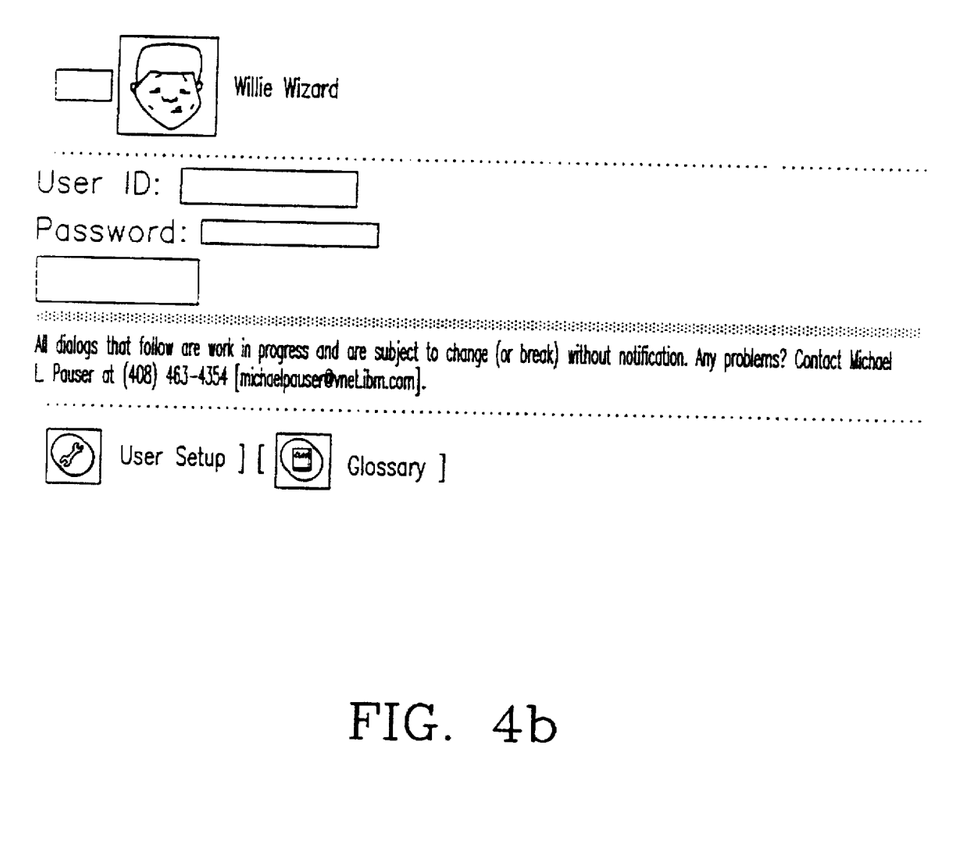

FIGS. 4a and 4b, collectively, illustrate the eight characters Freddy Funlover, Granny Joe, Lisa Lerner, Marty Mover, Ricki Rebel, Sam Seeker, Sara Scout and Willie Wizard used now to determine who may be interested in a particular connection that a computer user is making. The user is asked to place a value in the box to the left of each character of how much each character might be interested in the connection being made. The user can choose to make no selection, at which time the system would default to the user's persona as determined in FIG. 3. It is this process which initiates the transformation of element 205.

Figure 5:
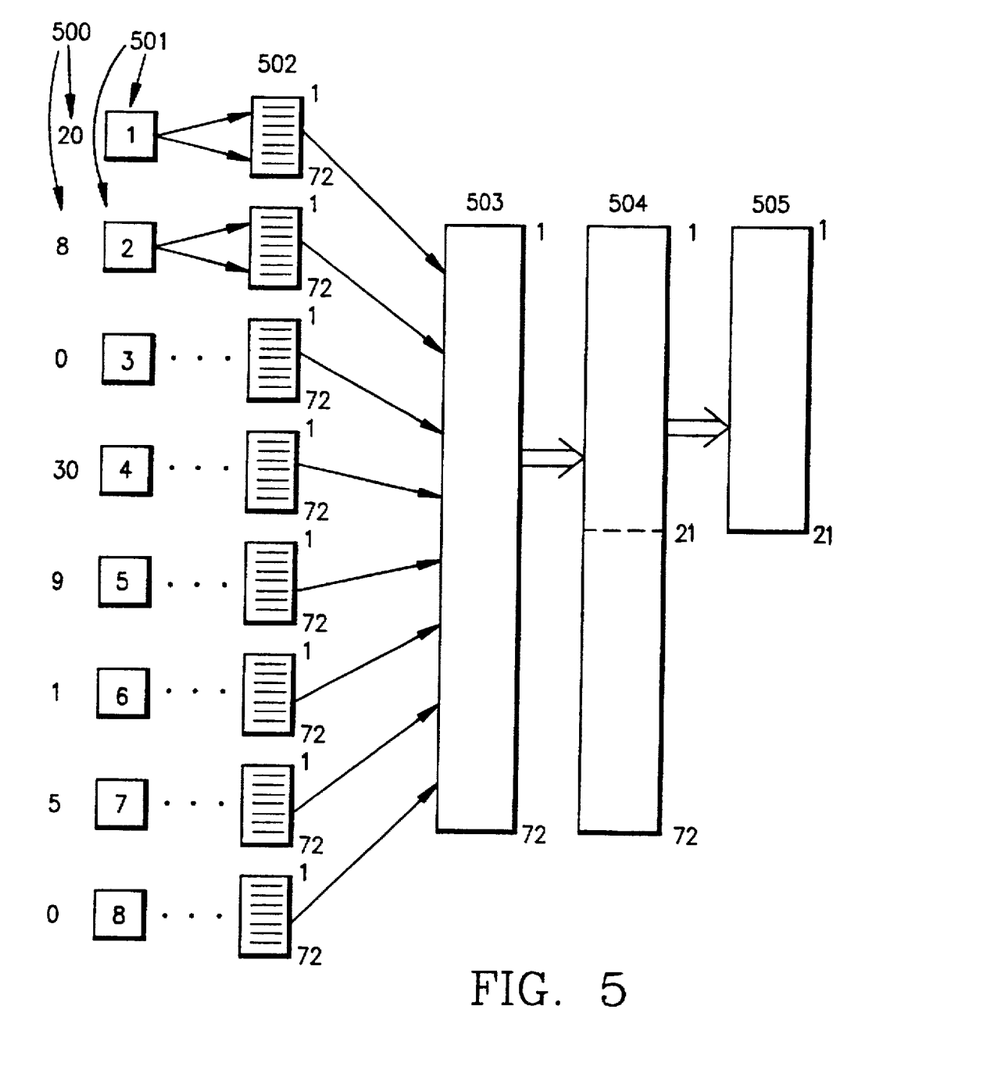
FIG. 5 illustrates the transformation process steps of FIG. 2.

FIG. 5 further illustrates the transformation process of steps 205 and 206 of FIG. 2. A computer user is asked to input values 500 indicating likeness to the eight personality characters 501. The values are then normalized as a percentage of 100%.

Figure 6A:
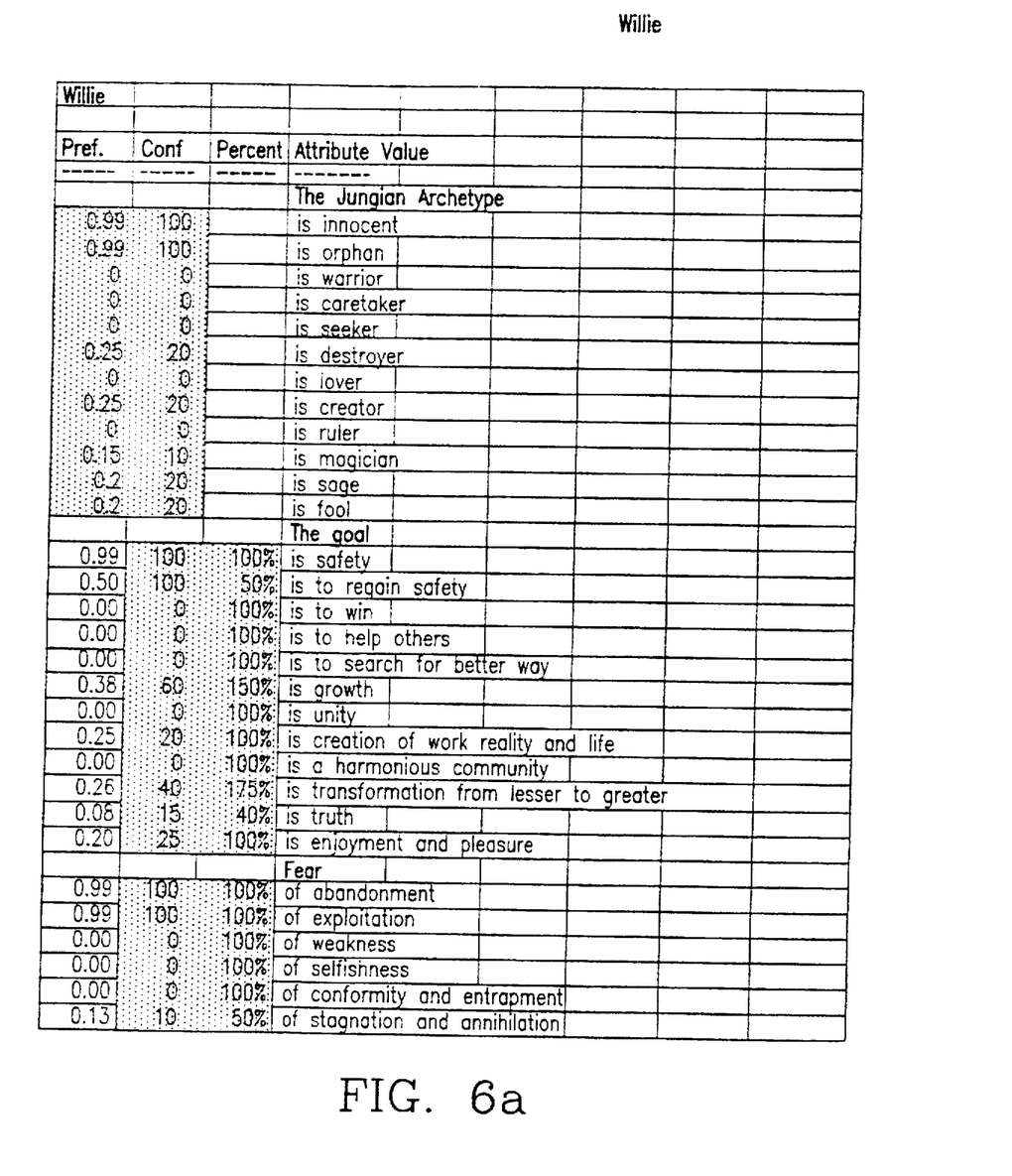

Using these percentages and the list of 72 preselected attributes of each personality 502, a list of the relative values of each of the 72 attributes that can be attributed to the percentage chosen for each of the eight personalities is determined. FIGS. 6a and 6b, collectively, provide for a spreadsheet showing a selected character Willie and the 72 attributes preselected for that character as well as some examples of relative values of the attributes. The weighted average of each list is then used to compile the final list of 72 attributes 503 which is used for the persona.

The transformation for element 205 is performed in a like manner with that of 204 by adding the additional steps of ordering by preference(ranking) 504 the 72 attributes of 503. The top 21 are then selected in element 505 and represent the 21 attributes attached to a particular connection.

The object is an effective use of attributes such that when a user tweaks a parameter value of one of the 8 characters it will cause a meaningful difference to occur.

In an alternative embodiment, personas may be blended to reflect an additional level of relative values. In this embodiment, personas are given proportional weighting to comply with an ordering based on a selected importance of each persona. An example of this, would be where responses to a first persona are treated favorably over response to a second persona. This proportional weighting would produce a biased blend of personas.

CONCLUSION

A system and method has been shown in the above embodiments for the effective implementation of a metaphoric interface for extracting a large set of parameters from a smaller set of inputs. While various preferred embodiments have been shown and described, it will be understood that there is no intent to limit the invention by such disclosure, but rather, is intended to cover all modifications and alternate constructions falling within the spirit and scope of the invention as defined in the appended claims.

While the preferred embodiment uses people as metaphoric objects, the invention could use any intermediate group of metaphors which would easily recognized by the average user or a targeted group of users. In addition the particular cast of eight characters used in the preferred embodiment could be changed to reflect whatever personality traits are desired. Changing personality sets would inherently change the attribute pair outcomes and persona developed as a result of the transformations of FIG. 2.

Appendix A - 1/2

*aqui* Persona

Freddy Funlover

Freddy seeks to fully enjoy life in the moment. How others see him is less important than his being joyous. Freddy says and does what others would be hanged for. Emma Goldman's statement 'If I can't dance, I don't want to be part of your revolution', says it all for Freddy's politics. Freddy is curious, loves exploring and adventure. Jumping from bridges on bungy cords makes Freddy leap for joy. Freddy saves us all from boredom.

Granny Joe

Granny was a marketing wizard for IBM in her heyday. Today small children and vice presidents gather round her rocker to hear her words. She reminisces about the days they invented holes as a way to count heads for the US census. Granny transforms everyone she meets. Her inner calm is contagious. Granny loves those who come to her for advice and everyone who comes feels deeply cared about and important in her presence.

Lisa Lerner

Lisa doesn't want to change the world; she wants to understand it. Lisa seeks truth through knowledge. Lisa sometimes gets confused when confronted with all the multiplicity and complexity of truth. Lisa seeks to become a wise woman.

Marty Mover

One of the true movers and shakers of society. Marty tries to keep up with what's hot. If it's new and exciting, Marty wants to know about it. Marty uses his knowledge to protect the employees of his company. He also does this by keeping his company in a good trim competitive position. While Marty enjoys money, status, and power his personal integrity comes first.

Appendix A - 2/2

Ricki Rebel

Ricki knows TV ads lie. Ricki knows politicians lie. She knows companies care more about making a buck than caring about people regardless of the B.S. of P.R. Ricki is a bit of the disappointed idealist. As a rebel against authority she IS the contarian. Only when Ricki joins with others does she reach her highest power in opposing authority. In her trusted group good things can happen.

Sam Seeker

Sam is feeling the need for greater purpose in his life. When Sam was younger he lived for exploring new places and looked everywhere for ideas to stimulate his mind. His questing ultimately lead to financial success, a loving family, and material wealth.

Now Sam, nearing middle age, is feeling the unsettling sense that he must seek something more. Sam finds himself operating at a new moral level. The environment no longer seems like a resource to be used but rather as something personal and life enriching. To stand on a mountain top and watch the sunset gives new meaning. Sam is starting to think about what might be at the core of those churches he has never had much time or inclination to visit.

Yesterday Sam brought home a starving stray dog about to be hit on the freeway. Love is starting to mean new things to Sam.

Sara Scout

Sara knows she is a special child. She sees her childhood as a safe garden and she knows it will be recreated in her adult world. Sara is sometimes considered charismatic by others because of the purity of her beliefs and her visions of a better world. Sara sometimes feels anger when her visions are blocked by others. She has learned to be charming enough to get what she wants next time.

Willie Wizard

Willie can't seem to get interested in Manifest Destiny. School is boring. When his parents lecture Willie on the virtues of a clean room he, just can't seem to focus. Parents are boring. When Willie's friends want to play hide and go seek, Willie gets lost. Friends are boring.

When Willie turns his computer on his mind lights up. Computers are cool. In cyberspace Willie is never bored. Willie knows a Pentium 120mhz, 21 inch .26mm display, 128MB RAM, and 2 SCSI-2 9GB hard drives is an apt image of heaven on earth. Nothing on the Internet can hide from Willie. The World Wide Web has sent Willie over the edge. Willie is no longer even aware of school, parents, or friends. Willie is lost in space.

[ aqui Home Page ] [ Persona ]

We claim:

1. A system for interactively obtaining computer user preferences comprising:

a base set of graphical metaphor objects, said graphical metaphor objects representing recognizable multi-trait profiles;

a preselected list of attributes describing each of said graphical metaphor objects;

a first graphical template which enables entering of a value representing a user's preferences, including likes and dislikes, of each of said graphical metaphor objects, a second template for extracting a user's valued preferences of a connection between two objects; said extracting of a user's preferences of a value of a connection comprises entering a value representing a user's preferences of each of said graphical metaphors as it relates to said connection;

blending of each of said multi-trait graphical object attributes based on said user values to provide a weighted evaluation, and wherein a user preference profile is determined based on said weighted evaluation of each of said values entered as they relate to said preselected list of attributes and a connection attribute profile is further determined based on an ordering and truncation of said weighted evaluation.

2. A system for interactively obtaining computer user preferences as per claim 1, wherein said multitrait personalities represent recognizable personalities of people.

3. A system for interactively obtaining computer user preferences as per claim 1, wherein a connection attribute profile is determined based on a weighted evaluation of each of said values entered as they relate to said preselected list of attributes.

4. An article of manufacture comprising a computer user medium having computer readable program code embodied therein which interactively obtains computer user preferences from a discrete number of graphical metaphor objects representing recognizable multi-trait profiles comprising:

computer readable program code which comprises a base set of said graphical metaphor objects;

computer readable program code which comprises a preselected list of attributes describing said graphical metaphor objects;

computer readable program code which comprises a first graphical template which enables entering of a value representing a user's preferences, including likes and dislikes, of each of said graphical metaphor objects, a second template for extracting a user's valued preferences of a connection between two objects, said extracting of a user's preferences of a value of a connection comprises entering a value representing a user's preferences of each of said graphical metaphors as it relates to said connection;

computer readable program code which comprises a blending of each of said multi-trait graphical object attributes based on said user values to provide a weighted evaluation, and wherein a user preference profile is determined based on said weighted evaluation of each of said values entered as they relate to said preselected list of attributes, a connection attribute profile is determined based on a weighted evaluation of each of said values entered as they relate to said preselected list of attributes and an ordering and truncation of said weighted evaluation.

5. An article of manufacture comprising a computer user medium having computer readable program code embodied therein which interactively obtains computer user preferences as per claim 4, wherein said graphical metaphors comprise a discrete number of characters representing recognizable personalities of people.

6. A computer program product usable with a programmable computer having computer readable program code embodied therein which interactively obtains computer user preferences from a discrete number of graphical metaphor objects representing recognizable multi-trait profiles comprising:

computer readable program code which comprises a base set of said graphical metaphor objects;

computer readable program code which comprises a preselected list of attributes describing said graphical metaphor objects;

computer readable program code which comprises a first graphical template which enables entering of a value representing a user's preferences, including likes and dislikes, of each of said graphical metaphor objects, a second template for extracting a user's valued preferences of a connection between two objects, wherein said extracting of a user's preferences of a value of a connection comprises entering a value representing a user's preferences of each of said graphical metaphors as it relates to said connection;

computer readable program code which comprises a blending of each of said multi-trait graphical object attributes based on said user values to provide a weighted evaluation, and wherein a user preference profile is determined based on a weighted evaluation of each of said values entered as they relate to said preselected list of attributes, a connection attribute profile is determined based on a weighted evaluation of each of said values entered as they relate to said preselected list of attributes and on an ordering and truncation of said weighted evaluation.

7. A computer program product usable with a programmable computer having computer readable program code embodied therein which interactively obtains computer user preferences as per claim 6, wherein said graphical metaphors comprise a discrete number of characters representing recognizable personalities of people.

* * * * *

UNITED STATES PATENT AND TRADEMARK OFFICE
CERTIFICATE OF CORRECTION

PATENT NO.    : 5,799,298
DATED         : August 25, 1998
INVENTOR(S)   : Bingham et al.

It is certified that error appears in the above-identified patent and that said Letters Patent is hereby corrected as shown below:

IN THE SPECIFICATION

Column 1,
Line 56, delete "a" and insert -- an --

Column 2,
Line 56, after "combination", insert -- , --
Line 66, after 105, insert -- , --

Column 3,
Line 27, after people, insert -- , --
Line 27, after method, insert -- , --

Column 4,
Line 1, after to, insert -- a --
Line 2, after connections, insert -- , --
Line 12, after that, delete "the"
Line 33, after character, insert -- , --
Line 37, delete "Appendix A, page 1 and 2 collectively, provide" and insert therefore -- The following narrative provides --.
Line 42, insert the following paragraphs:
-- Freddy Funlover - Freddy seeks to fully enjoy life in the moment. How others see him is less important than his being joyous. Freddy says and does what others would be hanged for. Emma Goldman's statement "If I can't dance, I don't want to be part of your revolution", says it all for Freddy's politics. Freddy is curious, loves exploring and adventure. Jumping from bridges on bungy cords makes Freddy leap for joy. Freddy saves us all from boredom.

Granny Joe - Granny was a marketing wizard for IBM in her heyday. Today small children and vice presidents gather round her rocker to hear her words. She reminisces about the days they invented holes as a way to count heads for the US census. Granny transforms everyone she meets. Her inner calm is contagious. Granny loves those who come to her for advice and everyone who comes feels deeply cared about and important in her presence.

UNITED STATES PATENT AND TRADEMARK OFFICE
CERTIFICATE OF CORRECTION

PATENT NO.   : 5,799,298
DATED        : August 25, 1998
INVENTOR(S)  : Bingham et al.

It is certified that error appears in the above-identified patent and that said Letters Patent is hereby corrected as shown below:

Lisa Lerner - Lisa doesn't want to change the world; she wants to understand it. Lisa seeks truth through knowledge. Lisa sometimes gets confused when confronted with all the multiplicity and complexity of truth. Lisa seeks to become a wise woman.

Marty Mover - One of the true movers and shakers of society. Marty tries to keep up with what's hot. If it's new and exciting, Marty wants to know about it. Marty uses his knowledge to protect the employees of his company. He also does this by keeping his company in a good trim competitive position. While Marty enjoys money, status, and power his personal integrity comes first.

Ricki Rebel - Ricki knows TV ads lie. Ricki knows politicians lie. She knows companies care more about making a buck than caring about people regardless of the B.S. of P.R. Rickie is a bit of the disappointed idealist. As a rebel against authority, she IS the contrarian. Only when Ricki joins with others does she reach her highest power in opposing authority. In her trusted group, good things can happen.

Sam Seeker - Sam is feeling the need for greater purpose in his life. When Sam was younger he lived for exploring new places and looked everywhere for ideas to stimulate his mind. His questing ultimately lead to financial success, a loving family, and material wealth. Now Sam, nearing middle age, is feeling the unsettling sense that he must seek something more. Sam finds himself operating at a new moral level. The environment no longer seems like a resource to be used, but rather as something personal and life enriching. To stand on a mountain top and watch the sunset gives new meaning. Sam is starting to think about what might be at the core of those churches he has never had much time or inclination to visit. Yesterday, Sam brought home a starving stray dog about to be hit on the freeway. Love is starting to mean new things to Sam.

Sara Scout - Sara knows she is a special child. She sees her childhood as a safe garden and she knows it will be recreated in her adult world. Sara is sometimes considered charismatic by others because of the purity of her beliefs and her visions of a better world. Sara sometimes feels anger when her visions are blocked by others. She has learned to be charming enough to get what she wants next time.

UNITED STATES PATENT AND TRADEMARK OFFICE
CERTIFICATE OF CORRECTION

PATENT NO. : 5,799,298
DATED : August 25, 1998
INVENTOR(S) : Bingham et al.

It is certified that error appears in the above-identified patent and that said Letters Patent is hereby corrected as shown below:

Willie Wizard - Willie can't seem to get interested in Manifest Destiny. School is boring. When his parents lecture Willie on the virtues of a clean room, he just can't seem to focus. Parents are boring. When Willie's friends want to play hide and go seek, Willie gets lost. Friends are boring. When Willie turns his computer on his mind lights up. Computers are cool. In cyberspace Willie is never bored. Willie knows a Pentium 120mhz, 21 inch .26mm display, 128MB RAM, and 2 SCSI-2 9GB hard drives is an apt image of heaven on earth. Nothing on the Internet can hide from Willie. The World Wide Web has sent Willie over the edge. Willie is no longer even aware of school, parents, or friends. Willie is lost in space. - -

Column 6,
Line 14, after would, insert -- be --

Signed and Sealed this

Eleventh Day of September, 2001

*Attest:*

*Attesting Officer*

NICHOLAS P. GODICI
*Acting Director of the United States Patent and Trademark Office*